Jan. 21, 1969 G. S. SPENCER 3,422,942
STATIONARY COIL ELECTROMAGNETIC CLUTCH
Filed Nov. 17, 1966
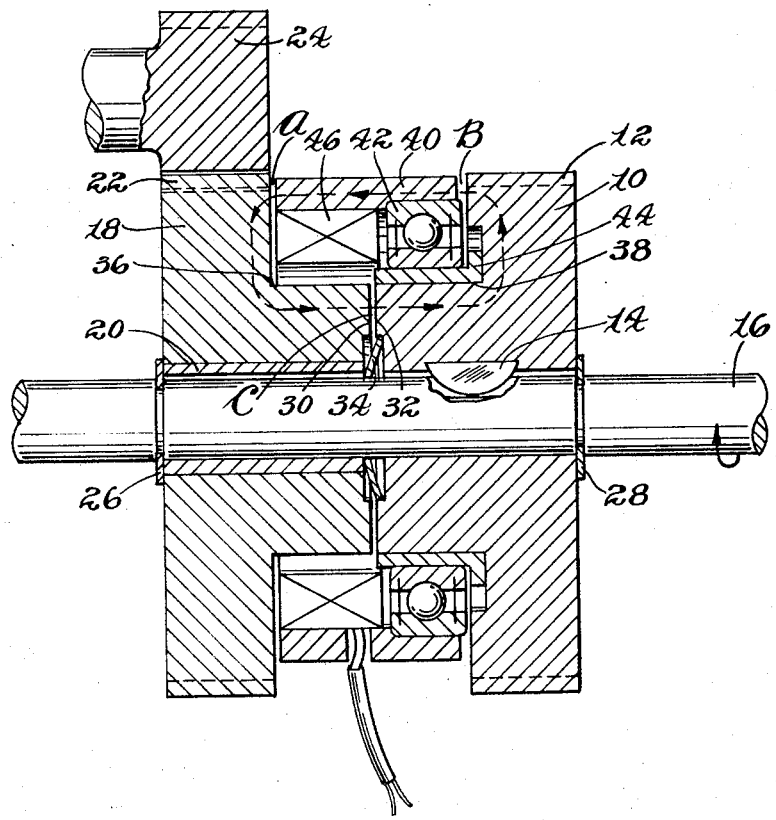
WITNESS:
Esther M. Stockton
INVENTOR.
Glenn S. Spencer
BY
W. S. Thompson
ATTORNEY

United States Patent Office

3,422,942
Patented Jan. 21, 1969

3,422,942
STATIONARY COIL ELECTROMAGNETIC CLUTCH
Glenn S. Spencer, Big Flats, N.Y., assignor to The Bendix Corporation, a corporation of Delaware
Filed Nov. 17, 1966, Ser. No. 595,149
U.S. Cl. 192—84                                 6 Claims
Int. Cl. F16d 27/04

ABSTRACT OF THE DISCLOSURE

An electromagnetic clutch having a stationary coil in which tilt loading of the bearing which interconnects the stationary sleeve and one of the rotatable torque exchanging members is greatly reduced. This reduction is achieved by maintaining the area of non-clutching air gaps equal, thereby presenting the stationary sleeve with balanced loading. All air gaps are available to contribute to the clutching force by generating axially-attractive forces on the rotary contactive components.

---

The present invention relates to electromagnetic clutch and/or brakes.

Some of the problems leading to expensive and magnetically inefficient clutch designs, particularly those having stationary coils, are non-working radial air gaps which are magnetically inefficient, and apply uneven loadings to rotating members, causing them to tilt on bearings. One solution to the problem is to hold extremely close fabrication tolerances which minimize the loadings. This solution is both expensive and not entirely effective, since at some point, a compromise must be made between cost and performance.

The present invention has as its objective the provision of a clutch design for a stationary coil clutch where tilt loading is minimized, an efficient magnetic path is provided where all air gaps are working air gaps, while permitting low cost fabrication techniques.

Other objects and advantages will become apparent on consideration of the attached description and drawing.

Referring to the drawing, there is illustrated a preferred embodiment of my invention wherein numeral 10 designates a first rotatable torque transmitting member having teeth 12 formed at its peripheral surface which may either drive an output gear or receive a driving input. Additionally, torque transmitting member 10 is connected by key 14 to axially disposed shaft 16 which also may be either an input or output shaft for rotation therewith. Key 14 and mating slot in the first torque transmitting member 12 may be a loose connection and permit axial movement or freedom relative to shaft 16, or may be entirely eliminated if it is desired to apply or receive torque only from teeth 12 and not shaft 16.

A second rotatable torque transmitting member 18 is journalled on bushing 20 concentric with shaft 16 for rotational mounting, which, however, may be independent of the shaft 16 rotation. Bushing 20 is preferably non-magnetic material to improve the flux circuit which will be later described. Teeth 22 are formed on the peripheral surface of torque transmitting member 18 for delivering an output to gear 24 or receiving an input rotation therefrom as desired. Second torque transmitting member 18 is movable a limited extent axially on shaft 16, and for this purpose, teeth 22 are teeth permitting axial motion. Snap ring stop members 26 and 28 are provided on shaft 16 to limit the maximum axial separation of first and second torque transmitting members 10 and 18. Depending on application, key 14 may be dispensed with and both members 10 and 18 permitted to rotate independently of supporting shaft 16.

The torque transmitting members each have confronting axially spaced clutch faces 30 and 32, respectively, which may be either friction surfaces or toothed surfaces which are mutually engageable to transmit torque from one member to the other. A spring member 34, which in the preferred case is an annular washer spring, is confined between the torque transmitting members to normally urge the clutch faces to the maximum disengaged spatial separation determined by stops 26 and 28.

Each torque transmitting member has an annular recess, 36 and 38 respectively, radially outwardly of its clutch surface to mutually form a stationary coil receiving cavity axially intermediate the torque transmitting members.

A tubular magnet ring member or sleeve 40 is disposed in the coil cavity and is closely axially spaced relative to projecting portions of the torque transmitting members to define axial flux air gaps A and B at either end of the sleeve. Sleeve 40 is mounted on bearing 42 which interconnects sleeve 40 and first torque transmitting member 10. Bearing 42 is supported by non-magnetic insert 44 which serves to substantially block flux leakage through the bearing. In the preferred form, the magnet member is fabricated from low cost tubing; however, in the broader sense, it may also be a casting or forging which in the usual case would require finishing and machining steps.

Fixedly secured to magnet ring 40 is an annular electromagnetic coil member 46, disposed radially intermediate ring 40 and torque transmitting member 18. When energized, coil 46 generates a flux path which, as illustrated by arrows, passes through magnet ring 40, air flux gaps A and B, first and second torque transmitting members 10 and 18 and across the spatial separation between confronting clutch surfaces 30 and 32 which is labelled flux gap C. The magnetic force across gaps A and C move torque transmitting member 18 axially against the bias of spring 34 into engagement with torque transmitting member 10 which is simultaneously attracted by the magnetic force across gaps B and C. In this connection, there is some play or axial movement inherent in bearing 42 causing gap B to be a variable and effective working gap. By "working gap" is meant a gap which causes an electromagnetic flux force which contributes to the attractive forces between torque exchanging elements 10 and 18.

An important realized objective of the present invention is minimization of the bearing tilt problem without the imposition of expensive close tolerance requirements or substitution of expensive bearing arrangements for the simple ball bearing illustrated in which a certain amount of play and tilting tendency is inherent. This objective is accomplished because air gaps A and B are in the same magnetic circuit and apply substantially equal and opposite axial forces to magnet ring 40. If due to a tolerance imperfection, a selected portion of gap A is less than other portions of that gap or gap B, a tendency for flux concentration at that point is offset by an opposite pull at gap B.

A second contributing factor results from the fact that magnet ring 40 being substantially uniform in cross section along its length, can be designed for maximum flux levels near saturation. Any tendency for distortion of the flux path results in a sharp increase in reluctance in the area of flux concentration, and tends to limit such concentrations. Thus, unbalancing forces which in known prior clutch designs have a regenerative effect tending to further accentuate tilting or unbalances, are caused to be either corrective or degenerative influences in the present arrangement.

I claim:
1. An electromagnetic torque exchanging device comprising:
    first and second rotatable torque transmitting members each having confronting normally axially spaced clutch engaging surfaces; at least one of said torque transmitting members being movable in an axial direction to effect engagement of said clutch engaging surfaces;

a magnet ring disposed intermediate said first and second torque transmitting members defining first and second axially spaced magnetic flux air gaps therewith;

bearing means interconnecting said magnet ring and one of said torque transmitting members; and an annular electromagnetic coil fixedly secured to said magnet ring radially intermediate said magnet ring, and said torque transmitting members generating a magnetic flux loop passing through said magnet ring, said first and second air gaps, said first and second torque transmitting members, and said axial space between said clutch engaging surfaces.

2. An electromagnetic torque exchanging device as claimed in claim 1 wherein:
said magnet ring is disposed radially outwardly of said clutch engaging surfaces.

3. An electromagnetic torque exchanging device as claimed in claim 1 wherein:
spring means axially confined between said first and second torque transmitting members to normally bias said clutch engaging surfaces towards spaced disengagement.

4. An electromagnetic torque exchanging device as claimed in claim 3 including:
stop means for limiting maximum spatial separation between said clutch engaging surfaces.

5. An electromagnetic torque exchanging device as claimed in claim 1 wherein:
said magnet ring is of sleeve configuration having substantially uniform cross section through its axial extent.

6. An electromagnetic torque exchanging device as claimed in claim 5 wherein said magnet ring is approaching electromagnetic saturation when said soil is generating electromagnetic flux.

References Cited
UNITED STATES PATENTS

| | | | |
|---|---|---|---|
| 2,180,412 | 11/1939 | Hart | 192—84 |
| 2,514,385 | 7/1950 | Garbarini et al. | 192—84 |
| 3,019,877 | 2/1962 | Onyskin | 192—84 |
| 3,272,290 | 9/1966 | Goddard | 192—84 |

BENJAMIN W. WYCHE III, *Primary Examiner.*

U.S. Cl. X.R.
188—163